L. B. WYGANT.
BALING PRESS PACKER.
APPLICATION FILED DEC. 2, 1912.

1,072,069.

Patented Sept. 2, 1913.

2 SHEETS—SHEET 1.

WITNESSES:
J. H. Gardner
M. J. Messenheimer

INVENTOR:
Lewis B. Wygant,
BY
E. F. Silvius,
ATTORNEY.

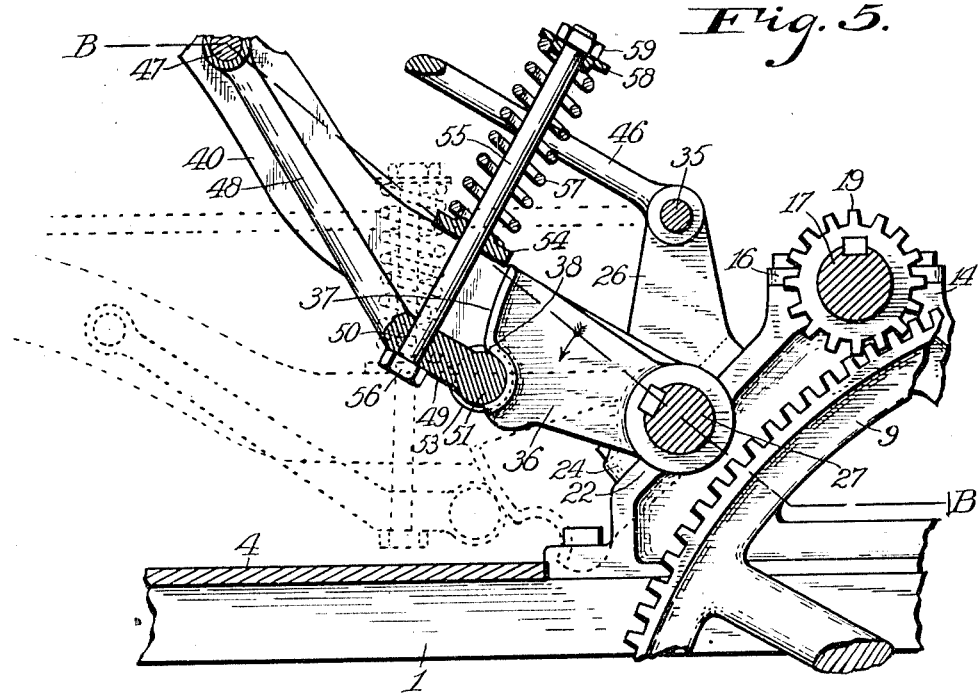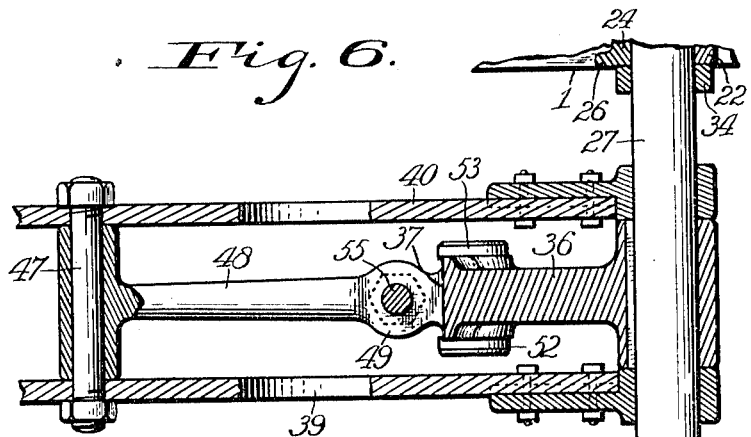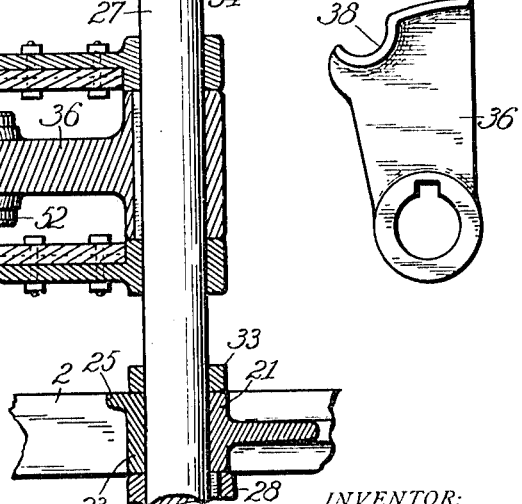

UNITED STATES PATENT OFFICE.

LEWIS B. WYGANT, OF VINCENNES, INDIANA.

BALING-PRESS PACKER.

1,072,069.  Specification of Letters Patent.  Patented Sept. 2, 1913.

Application filed December 2, 1912. Serial No. 734,594.

*To all whom it may concern:*

Be it known that I, LEWIS B. WYGANT, a citizen of the United States, residing at Vincennes, in the county of Knox and State of Indiana, have invented a new and useful Baling-Press Packer, of which the following is a specification, reference being had to the accompanying drawings and to the letters and figures of reference marked thereon.

This invention relates to mechanism of the type that is designed for assisting in feeding hay or other substance into baling presses and for packing the substance in the baling chamber thereof preparatory to compressing the substance into the form of bales, the invention having reference more particularly to a packer that is adapted to yield without liability to become fractured when the accumulation of hay or other substance in the baling chamber increases the resistance and prevents the packer head from traveling its maximum extent.

The object of the invention is to provide an improved and efficient packer or feeder for baling presses that shall be so constructed as to permit a maximum travel of the packer head and also variable extent of travel downward as the baling chamber becomes filled, and exert practically equal pressure at all strokes, and which shall be adapted to be applied to various forms of presses.

A particular object of the invention is to provide an improved packer of the above mentioned character that shall be especially adapted to be applied to the baling press forming the subject-matter of my pending application for Letters Patent of the United States, Serial No. 664,250, filed December 6, 1911.

With the above mentioned and other objects in view, the invention consists in an improved packer arm provided with a spring for affording a limited extent of yield, and provided also with a slip-connection permitting the actuating mechanism of the arm to travel a uniform extent while permitting variable extent of travel of the packer head when in action, to the end that the packing force shall be practically constant during the filling of the baling chamber; and the invention consists further in the novel parts and in the combinations and arrangements of parts as hereinafter particularly described and further defined in the accompanying claims.

Figure 1:
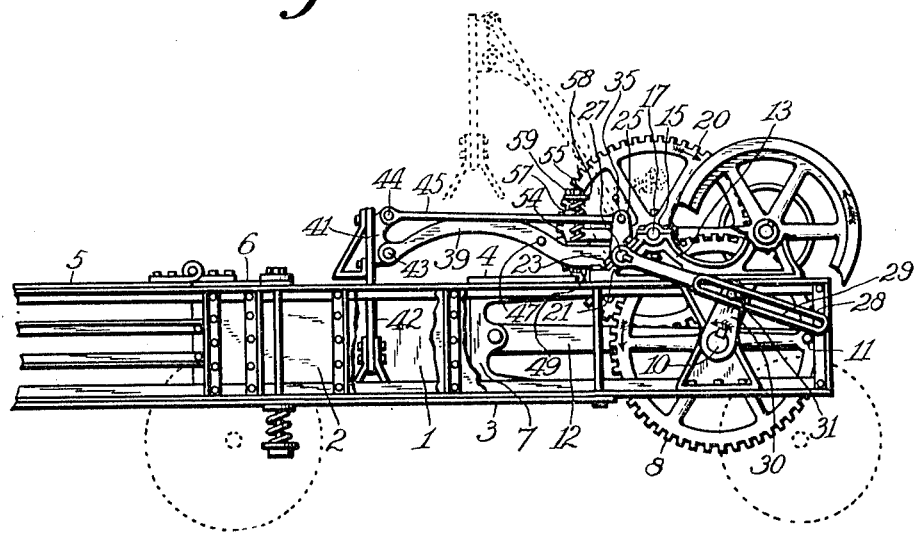
Figure 2:
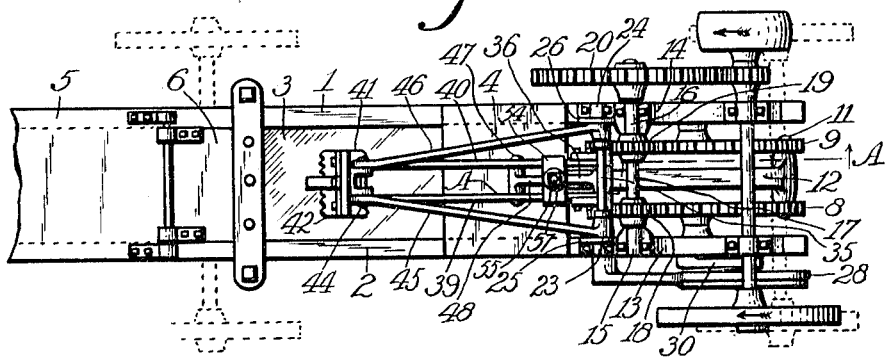
Figures 3, 4:
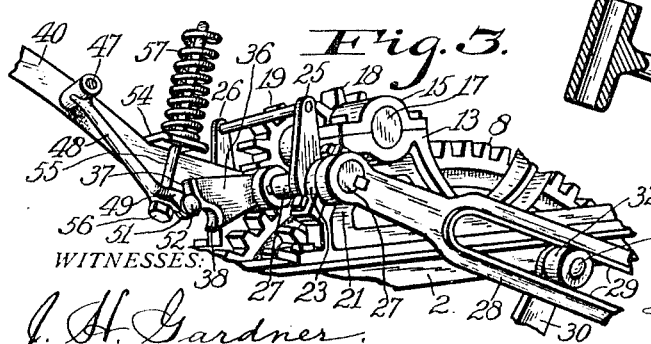

Referring to the drawings, Figure 1 is a fragmentary side elevation of a baling press similar in general construction to that described in said application for Letters Patent and having the improved packer applied thereto; Fig. 2, a top plan of the preceding figure; Fig. 3, a fragmentary perspective view of the more essential features of the invention; Fig. 4, a perspective view of one of the parts of the improvement; Fig. 5, a fragmentary vertical section approximately on the line A A in Fig. 2; Fig. 6, a fragmentary section approximately on the line B B in Fig. 5; Fig. 7, a side elevation of one of the parts of the packer arm; and Fig. 8, a perspective view one of the parts of the improvement.

Throughout the drawings similar reference characters indicate corresponding elements or features of construction herein referred to.

In order that the invention and its mode of operation may be clearly understood it is illustrated in connection with parts of the baling press above referred to which comprises two suitable sides 1 and 2, a bottom 3 secured to the sides, a top plate 4 secured on one end portion of the sides, a top plate 5 secured to the opposite or rearward end portion of the sides, an upwardly yielding plate 6 hinged to the plate 5 with space left between the plates 4 and 6 into which to feed the hay or other substance to be baled in the baling chamber formed in the press frame. A rammer 7 is suitably guided in the baling chamber for pressing the substance into compact bales. Two gear wheels 8 and 9 provided each with an axial shaft 10 are mounted in the two sides respectively and connected together by a crank pin 11, a pitman 12 being connected to the crank pin and also to the rammer.

In practically carrying out the objects of the invention two bearing blocks 13 and 14 are secured upon the sides of the press frame and are adapted to constitute journal bearings having caps 15 and 16 thereon respectively and rotatably supporting a driving shaft 17 having two pinions 18 and 19 secured thereto that are in mesh with the two gear wheels 8 and 9 respectively, a gear wheel 20 being secured to the shaft to be suitably driven. The blocks 13 and 14 are adapted to also form two other journal bearings 21 and 22 respectively on the rearward side thereof which are provided respectively with caps 23 and 24, the caps having integral standards 25 and 26 thereon respectively. A rock shaft 27 is rotatively mounted in the journal bearings 21 and 22 and has a rocker arm 28 secured thereto that has a longitudinal slot 29 therein. A crank arm 30 is secured to an axial shaft 10 and has a crank pin 31 thereon that extends into the slot and preferably has a roller 32 thereon. The rocker arm 28 and the crank arm 30 are suitably set so as to be in harmony with the movement of the rammer 7. The shaft 27 preferably is provided with two collars 33 and 34 to prevent longitudinal movement of the shaft relative to its supporting boxes. The standards 25 and 26 support a pivot rod 35 at a suitable distance above the shaft 27.

The packer arm, which assists in feeding the substance into the baling chamber, comprises a novel rocker arm 36 which is fixedly secured at one end to the rock shaft 27 and its opposite end has a cam-face 37 thereon that is curved and eccentric to the axis of the rock shaft, the end of the rocker arm having also a concave depression 38 at the lower end of the cam-face. Two reach-arms 39 and 40 are pivotally connected at one end to the shaft 27 at opposite sides of the rocker arm 36. A feed head 41 of suitable construction has a downwardly extending packing arm 42 and is provided with two pivots 43 and 44, one of which is below the other and connects the reach arms with the head, two rods 45 and 46 being connected to the upper one of the pivots and also to the pivot rod 35. A pivot 47 is connected to the reach arms 39 and 40 at a suitable distance from the shaft 27 and a connecting rod 48 is connected at one end thereto and has an oblique angled portion 49 that normally is approximately on or below the plane of the under side of the reach arms, the portion 49 extending toward the rocker arm 36, and it has a bolt hole 50 therein, the portion 49 having also a cylindrically shaped end 51 that is normally seated in the depression 38 and may slide in contact with the cam-face 37 when forced out of the depression to constitute the slip connection between the rock shaft and the feeder head, the end 51 preferably having guide flanges 52 and 53 on opposite ends thereof that operate at the opposite sides of the rocker arm. A cross bar 54 is seated upon the reach arms 39 and 40. A bolt 55 extends loosely through the bolt hole 50 in the rod or bar portion 49 and has a head 56 seated against the under side of the said portion, and having a coil spring 57 on the cross bar and extending about the bolt, and a washer 58 is seated upon the spring and is retained on the bolt adjustably by means of a nut 59 screwed on the bolt, so that the tension of the spring may be varied.

It is obvious that a platform, unnecessary to describe in detail, is commonly arranged upon the press frame upon which to place the loose hay or other substance to be fed into the baling chamber.

In practical use, when the machine is in operation and an attendant feeds the hay or other substance into the baling chamber, while the rammer 7 is retracted the feeder arm 42 is thrust down into the baling chamber to pack the hay or substance therein upon the floor 3, and when the packer arm is descending or when rising it appears as more clearly shown in Fig. 5 but when the hay or substance accumulates the travel of the packer head 41 downward is resisted and limited by the accumulation, while the rocker arm 36 continues through its full stroke, with a tendency to swing away on its axis from the axis of the pivot 47 on which the rod or bar 48 swings away from the shaft 27, so that the end 51 slides out of the depression 38 onto the cam-face 37, which being eccentric remains in contact with the end 51 and maintains the required pressure on the spring 57 to enable the packer head to exert the desired pressure on the hay to pack and to assist in feeding it to the baling chamber, the position of the slip connection relatively being shown by broken lines in Fig. 5 and in full lines in Fig. 3. When the rocker-arm 36 swings upward the end 51 drops back into the depression 38 and thereby enables the rocker-arm to elevate the reach-arms 39 and 40. Other results of the operation of the invention will be readily understood from the foregoing description of the details of construction and the function of the several parts of the improvement.

Having thus described the invention, what is claimed as new is:—

1. A packer including a rock-shaft, a rocker-arm fixed on the rock-shaft and having a cam-face on its end that is eccentric to the rock-shaft, a reach-arm pivoted to the rock-shaft, and a friction tension device movably mounted on the reach-arm in movable contact with and spring-pressed to the cam-face.

2. A packer including a rock-shaft, a rocker-arm fixed on the rock-shaft and having a cam-face on its end that is eccentric to the rock-shaft, a reach-arm pivoted to the rock-shaft, a tension device movably mounted on the reach-arm in movable contact with the cam-face, and a spring coöperating with the reach-arm and the device for yieldingly holding the device forcibly in contact with the cam-face.

3. A packer including a rock-shaft, a rocker-arm fixed on the rock-shaft and having a depression in its end, a reach-arm pivoted to the rock-shaft, a rod pivoted to the reach-arm and having an end normally seated in the depression and movable therefrom and against the end of the rocker-arm, and a spring coöperating with the reach-arm and the rod for yieldingly holding the latter in the depression.

4. A packer including a rock-shaft, a rocker-arm fixed on the rock-shaft and having a curved cam-face on its end that is eccentric to the rock-shaft, the rocker-arm having also a depression in its end at the end of the cam-face that is the closer to the rock-shaft, and a reach-arm pivoted on the rock-shaft and provided with a slip-connection device yieldingly forced into the depression to be forced therefrom and onto the cam-face.

5. The combination with a rock-shaft, two reach-arms pivoted on the rock-shaft, a cross bar seated upon the two reach-arms, and a spring seated upon the cross-bar, of a rocker-arm fixed to the rock-shaft and having a cam-face on its end that is eccentric to the rock-shaft, the end having a concave depression therein at the end of the cam-face that is the closer to the rock-shaft, a rod pivoted at one end to the two reach-arms and having a cylindrically-shaped opposite end normally seated in the depression to be moved therefrom and into contact with the cam-face, and a bolt connected to said rod and also with said spring.

6. The combination with a frame, of two bearing-blocks secured upon the frame, a rock-shaft rotatively mounted on the bearing blocks, two caps secured to the two bearing-blocks respectively and retaining the rock-shaft thereon, each cap having a standard thereon, a pivot-rod supported by said standards, a rocker-arm fixed to the rock-shaft and having a depression in its end, a reach-arm pivoted to the rock-shaft, a connecting-rod pivoted to the reach-arm and having an end normally seated in said depression and movable therefrom into sliding contact with the end of the rocker-arm, yielding means connecting said connecting-rod with said reach-arms, a packing-head pivotally connected to said reach-arms, and two parallel rods pivotally connected to said reach-arms and connected also to said pivot-rod.

7. In a baling press, the combination with a frame having an open-top chamber therein, of two bearing blocks fixedly secured upon the forward portion of the frame, a driving shaft rotatably supported on the top of the bearing-blocks, a pinion secured to the shaft, a gear wheel rotatably mounted in the frame in mesh with said pinion and provided with a crank-arm, a rock-shaft rotatively mounted on the rearward side of said two bearing-blocks, an operating-arm secured to the rock-shaft and operatively connected with said crank-arm, a rocker-arm fixed to said rock-shaft and having a cam-face on its free end and also a depression at the lower end of the cam-face, two reach-arms pivotally connected to the rock-shaft, a connecting rod pivoted to said reach-arms and having a cylindrical end normally seated in said depression and movable therefrom onto said cam-face, means for yieldingly forcing said cylindrical end into said depression, and a feed-head mounted on said reach-arms to be carried thereby into or out of said open-top chamber.

In testimony whereof, I affix my signature in presence of two witnesses.

LEWIS B. WYGANT.

Witnesses:
CARRIE O. DOREY,
HERBERT F. JONES.